Sept. 6, 1927.
H. W. HALL
COMBINED VOLT METER AND PHASE ROTATION INDICATOR
Filed May 26, 1924
1,641,757
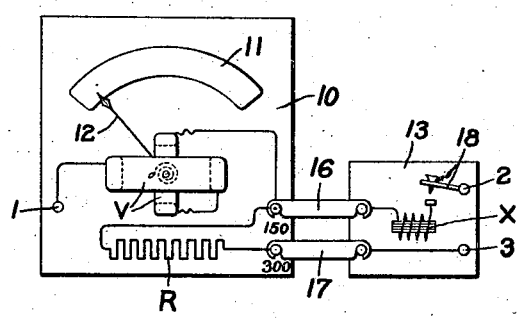
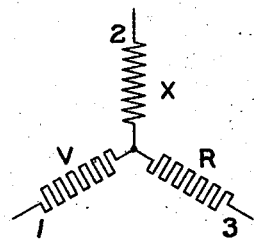
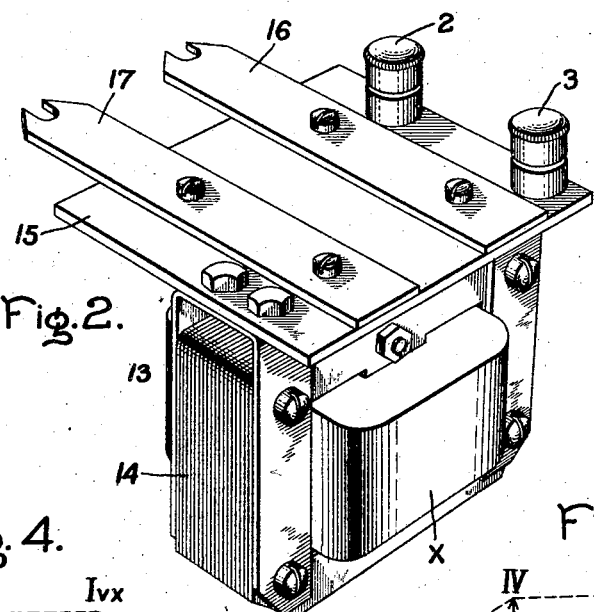
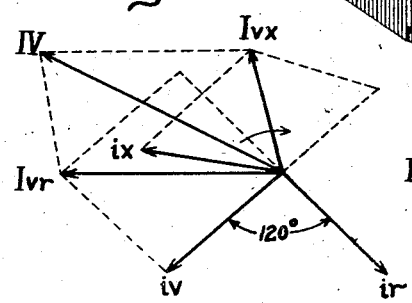
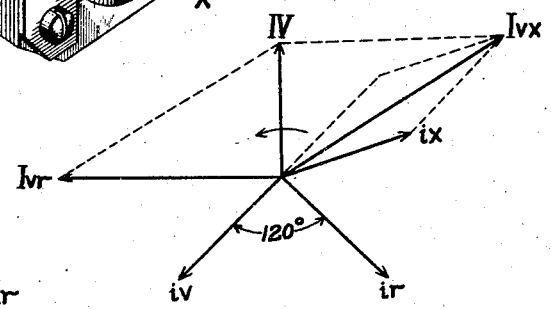
Inventor:
Horton W. Hall,
by *Alexander S. Lunn*
His Attorney.

Patented Sept. 6, 1927.

1,641,757

UNITED STATES PATENT OFFICE.

HORTON W. HALL, OF LYNN, MASSACHUSETTS, ASSIGNOR TO GENERAL ELECTRIC COMPANY, A CORPORATION OF NEW YORK.

COMBINED VOLTMETER AND PHASE-ROTATION INDICATOR.

Application filed May 26, 1924. Serial No. 715,787.

My invention relates to a combined volt meter and phase rotation indicator for alternating current circuits and its object is to provide a simple device to be used in connection with the usual double scale alternating current volt meter so that the volt meter may be used to indicate the phase rotation of a polyphase circuit.

The so-called double scale volt meter has three terminals, one terminal being common and the other two terminals being used alternately for different voltages, for indicating voltages from zero to 150, the volt meter coils may be connected to the circuit by one set of terminals so that a full scale deflection corresponds to 150 volts and for indicating higher voltages, the volt meter coils may be connected in series with a permanent resistance which is generally mounted in the volt meter case so that full scale deflection corresponds to 300 volts. My invention consists in adding to such a volt meter a suitable reactance coil or other phase shifting impedance which when connected with the volt meter terminals and to a polyphase circuit as hereinafter described, permits the instrument to be used for indicating the phase rotation of such circuit.

In carrying my invention into effect, I connect the higher voltage terminals of the volt meter across two phases of the circuit and note the volt meter deflection. Then I connect the reactance coil between another phase of the circuit and the lower voltage terminals of the volt meter. This causes currents differing in phase to flow through the volt meter coils and the resultant current will be greater or less than before depending upon whether the reactance current vector is shifted toward or away from the original current vector of the volt meter coils, or in other words, the new volt meter deflection will be larger or smaller, depending upon the direction of phase rotation.

The features of my invention which I believe to be novel and patentable will be pointed out in the claims appended hereto.

For a better understanding of my invention reference is made in the following description to the accompanying drawing in which Fig. 1 represents the circuit connections involved in my invention; Fig. 2 represents the external appearance of the auxiliary reactance used with my invention; Fig. 3 represents a schematic diagram of the circuit connections when the instrument is used for indicating phase rotation; and Figs. 4 and 5 are vector diagrams explanatory of clockwise and counter-clockwise phase rotation indications respectively.

Referring now to Fig. 1, 10 represents the casing of an ordinary double scale alternating current volt meter with the covering removed in order to show the interior parts. The scale is indicated at 11, the pointer at 12, the coils at V and the internal resistance at R. The instrument is represented as being of the dynamometer type having stationary and movable coils connected in series. When the external circuit is connected across terminals 1 and 150, full scale deflection of the instrument corresponds to 150 volts for example and when the external circuit is connected across terminals 1 and 300, the resistance R is connected in series with the coils V and full scale deflection corresponds to 300 volts for example.

The external reactance element is represented at 13 and is shown as actually built in Fig. 2. It consists of a laminated iron core 14 upon which is wound a coil X. The laminations are secured in a suitable framework and support a terminal board 15 upon which are mounted the binding posts 2 and 3 and conductor bars 16 and 17, preferably spaced and shaped to slip over the terminal posts 150 and 300 of the volt meter. The circuit connections are represented in Fig. 1 and preferably include a switch 18 in the circuit of the reactance coil X. The reactance device may, if desired, be built into the volt meter case 10, but I prefer to build it as a separate instrument which may be easily attached to existing double scale volt meters.

Now let us assume that terminals 1 and 3 of Fig. 1 are connected across two phases of a three-phase circuit. This is the equivalent of making the connection across terminals 1 and 300 of the volt meter and the volt meter will indicate the voltage on the higher scale. Now, if we connect the remaining phase of the three-phase circuit to terminal 2 and close switch 18, we will have the arrangement schematically illustrated in Fig. 3 where V represents the resistance of the volt meter coil, R the internal resistance element of the volt meter and X the external reactance coil. The volt meter coils are made to have a high resistance and low reactance in accordance with good practice in order that the volt meter will be substantially independent of frequency changes. When the switch 18 is closed, the volt meter deflection will increase or decrease, depending upon whether the phase rotation is 1—2—3 or 1—3—2, corresponding to clockwise and counter-clockwise phase rotations respectively.

The reason for this will be clear from a consideration of the vector diagrams shown in Figs. 4 and 5. In Fig. 4, $iv$ represents the current vector for the volt meter coils alone, $ir$, the corresponding vector for the resistance R, and $ix$, the current vector for the reactance coil alone. In this case, a clockwise rotation is assumed and the vector $ix$, instead of being drawn 120 degrees away from vectors $iv$ and $ir$, lags nearly 90 degrees behind such position due to the well known lagging effect which the reactance X produces on the current flowing therethrough. The resultant current flowing through the volt meter coils V and the resistance R when the reactance coil is disconnected may be represented by the vector $Ivr$ obtained by adding vectors $iv$ and the reverse of $ir$ and corresponds to the voltmeter deflection under this condition. When the reactance coil X is connected as represented in Fig. 3, the current flowing through the volt meter coils will have another component, namely, the resultant of the current flowing through V and X, which is obtained by adding vectors $ix$ and the reverse of $iv$ or $Ivx$ and the resultant current flowing through the volt meter coils will now be the vector sum of $Ivr$ and $Ivx$, or IV, corresponding to the new volt meter deflection which is appreciably greater than the original deflection corresponding to $Ivr$.

In Fig. 5 the corresponding vector relations for a counter-clockwise rotation are shown and are designated as in Fig. 4. Here vectors $iv$ and $ir$ have the same positions as in Fig. 4, but $ix$ now lags behind in the opposite sense of rotation as compared to Fig. 4. The volt meter current $Ivr$, without the reactance X connected, is of the same magnitude as was the case in Fig. 4 and the volt meter deflection is the same, but with the reactance coil X connected in, the volt meter deflection is decreased to the value corresponding to the resultant vector IV.

The invention is not limited to the case of a three-phase circuit, but is applicable to any polyphase circuit where the reactance connection to a third phase, as above described, causes the resultant volt meter current to be different for different directions of phase rotation.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. A combined voltmeter and phase rotation indicator comprising a voltmeter provided with a resistance, said voltmeter and resistance being connected in series across two phases of a polyphase circuit to indicate the voltage thereof, and a reactance arranged to be connected between another phase of the polyphase circuit and the voltmeter circuit at a point between said resistance and voltmeter to increase or decrease the current flowing through the voltmeter depending upon the direction of phase rotation.

2. In combination, an alternating current voltmeter of the dynamometer type, a resistance connected in series with said voltmeter for voltage measurements and a phase modifying impedance arranged to be connected in star with said voltmeter and resistance for indicating phase rotation.

3. In combination, a polyphase circuit, a voltmeter, a resistance connected in series with said voltmeter across two phases of said circuit for indicating the voltage thereof and a reactance arranged to be connected in star with said voltmeter and resistance to another phase of the circuit for indicating the phase rotation of said circuit.

4. The method of determining the phase rotation of a polyphase circuit which consists in connecting the common and high voltage terminal of a double range voltmeter across two lines of the circuit and observing the voltmeter deflection and then connecting a reactance between the low voltage voltmeter terminal and another phase of the circuit and noting the change in deflection.

5. In combination, a double range voltmeter and a device for use therewith for determining phase rotation, comprising a reactance coil provided with a terminal board, spaced connecting bars on said board arranged to fit the high and low voltage terminals of the voltmeter, a binding post on said board connected to one of said bars and a binding post connected in series with said coil to the other bar.

6. The method of determining the phase rotation of a polyphase circuit which consists in connecting the common and high voltage terminal of a double range voltmeter across two phases of a polyphase circuit and observing the voltage deflection and then connecting a phase modifying impedance between the low voltage terminal of the voltmeter and another phase of the circuit and noting the change in deflection.

In witness whereof, I have hereunto set my hand this 23rd day of May, 1924.

HORTON W. HALL.